US012726498B2

(12) United States Patent
Wray et al.

(10) Patent No.: US 12,726,498 B2
(45) Date of Patent: Sep. 1, 2026

(54) METHOD TO DETECT VULNERABLE INTERNET SERVICES VIA CHANGES TO GLOBAL PORT-SCANNING TRAFFIC

(71) Applicant: Oracle International Corporation, Redwood Shores, CA (US)

(72) Inventors: Stuart Wray, Edinburgh (GB); Melissa Licciardello, Zurich (CH)

(73) Assignee: Oracle International Corporation, Campbell, CA (US)

( * ) Notice: Subject to any disclaimer, the term of this patent is extended or adjusted under 35 U.S.C. 154(b) by 180 days.

(21) Appl. No.: 18/613,393

(22) Filed: Mar. 22, 2024

(65) Prior Publication Data

US 2025/0301002 A1 Sep. 25, 2025

(51) Int. Cl.
*H04L 29/06* (2006.01)
*H04L 9/40* (2022.01)

(52) U.S. Cl.
CPC ...... *H04L 63/1425* (2013.01); *H04L 63/1433* (2013.01)

(58) Field of Classification Search
None
See application file for complete search history.

(56) References Cited

U.S. PATENT DOCUMENTS

| | | | | |
|---|---|---|---|---|
| 11,316,872 | B2 * | 4/2022 | Meshi | H04L 63/1416 |
| 11,991,187 | B2 * | 5/2024 | Panse | H04L 63/1425 |
| 2011/0016525 | A1 * | 1/2011 | Jeong | H04L 63/1425 382/218 |
| 2020/0059480 | A1 * | 2/2020 | Junod | H04L 63/1433 |
| 2020/0244676 | A1 * | 7/2020 | Amit | H04L 63/1425 |
| 2020/0244683 | A1 * | 7/2020 | Meshi | H04L 63/1425 |
| 2020/0244685 | A1 * | 7/2020 | Meshi | H04L 63/1441 |
| 2021/0392500 | A1 * | 12/2021 | Pollington | H04L 63/107 |
| 2024/0291830 | A1 * | 8/2024 | Kostov | H04L 63/1425 |
| 2025/0175456 | A1 * | 5/2025 | Crabtree | H04L 9/0643 |

* cited by examiner

*Primary Examiner* — Shin-Hon (Eric) Chen
(74) *Attorney, Agent, or Firm* — Hickman Becker Bingham Ledesma LLP; Stephen J. Walder, Jr.

(57) ABSTRACT

A computer-implemented method includes receiving signals via a network at ports on the network, the signals corresponding to scanning activity at the ports by a plurality of sources on the network; the sources are located at a plurality of geographical bins. The method also includes determining a popularity score for each of the ports, based on a number of geographical bins sending signals to the in a first time period; calculating, for each of the geographical bins, a probability of scanning activity occurring at a port in a second time period, resulting in a plurality of probabilities for that port; and calculating, for each of the ports, a surprisingness index based on the plurality of probabilities. The method further includes estimating, in accordance with the popularity score and the surprisingness index for each of the ports, a likelihood that the port is experiencing suspicious scanning activity.

14 Claims, 9 Drawing Sheets

100

200

400

500

600

METHOD TO DETECT VULNERABLE INTERNET SERVICES VIA CHANGES TO GLOBAL PORT-SCANNING TRAFFIC

FIELD OF THE INVENTION

The present invention relates to monitoring network traffic, and more particularly to a method for detecting vulnerable internet services by analyzing changes to port-scanning traffic.

BACKGROUND

Most cyberattacks occur via the Internet. Network traffic analysis can be a powerful tool to detect attacks in real time, in order to implement appropriate countermeasures. However, the amount of data involved often very large, so that in-depth manual analysis of network events is not feasible. It is desirable to implement concise metrics to highlight suspicious activities.

A typical way to discover potential vulnerabilities from the point of view of an attacker is performing a network port scan on a specific host. Port scanning is used to identify open ports on a host, and thus can indicate which services are implemented. Analyzing the scanning activity from external sources provides information regarding what potential attackers might be looking for. Usually, defenders count the number of probing/scanning packets to particular ports, or the number of distinct source Internet Protocol (IP) addresses from which particular ports are probed, in order to see what ports are newly popular and hence are interesting to attackers. This may indicate that the scanners have detected some new vulnerability. From a defender's point of view, sources that are scanning for such newly popular ports by doing so indicate that they should be treated with suspicion.

Most publicly routable IP addresses can be pinpointed to some specific geographic locations, assigned from an internet service provider (ISP)+in a mostly static fashion. Several services and databases provide geolocation given a specific IP address. Such databases can be used to learn the geographic location of the Internet hosts which send data to publicly routable IPs.

A particular host, identified by an IP address, typically has several ports (identified by numbers in the range from 0 to 65535). Services implemented on the Internet are each listening at specific port numbers, meaning that they are eventually accepting requests there. If a specific port is unreachable, no service from that host is actively available there.

Popular applications use standard ports whose numbers are well known. For example, HTTP (Hypertext Transfer Protocol) and HTTPS (Hypertext Transfer Protocol Secure) servers listen to TCP (Transfer Control Protocol) port 80 and port 443 respectively. A server, e.g. an HTTP server, can still be implemented in a different port, but the user must be aware of it at request time. The user also needs to communicate to the server information regarding the user's port, at which the user will be listening for a reply.

If some suspicious activity is detected having as a target a specific port, some possible reasons include: (i) A vulnerability has been discovered on an application that runs on a specific port. Attackers are searching, among publicly routable IP addresses, for devices that have that port open, because that means they might be running that potentially exploitable application; (ii) Scanning by a botnet, which consists of cooperating malware that runs in multiple infected devices. Botnets can periodically scan the Internet to search for peer infected devices and to communicate with them. The ports on which they communicate must be known by the members of the botnet, and this in itself can generate suspicious traffic.

It is desirable then, from the point of view of defensive security, for an organization to analyze the incoming external traffic to understand what ports are being used, and what is surprising about that use. The information gathered by such analysis not only gives an advantage to the organization in term of prompt response, but can also help to identify suspicious activity in the organization's internal network. Comparing internal and external traffic can then be useful to identify potential threats.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In accordance with aspects of the disclosure, metrics for monitoring for suspicious scanning of IP addresses include: popularity of a port, geographical pervasiveness, surprisingness index (SI), and source entropy score.

An organization can have available to it a range of publicly routable IP addresses. Addresses in this range may be routable worldwide; however, not all addresses in the range may have live hosts that respond to traffic. Some addresses are assigned but not used, meaning that no actual machine is connected to such addresses. A set of assigned public IP addresses that are assigned but unused is referred to herein as a darknet. An attacker scanning for vulnerable machines cannot be sure that an address belongs to a darknet, and thus will scan such addresses along with all other publicly routable addresses.

In various embodiments, a processing system analyzes traffic coming towards a darknet using a NetFlow protocol. A particular device (e.g., router or switch) in the processing system can be configured to provide summaries of traffic flows (traffic logs) which are being carried by that device. The data collected in NetFlow include the number of packets in flow during a particular time interval. A flow, as referred to herein, is identified by a particular source and destination IP address, source and destination port, and protocol. In various embodiments, analysis of the logs is simplified by aggregating the logs with a time granularity of 10 minutes and extracting limited categories of information.

2. Popularity and Surprisingness

A port receiving traffic may be characterized in terms of complementary metrics: surprisingness index (SI) and popularity. Ports with a high SI are statistically unlikely to be sent traffic based on historical data; ports with a high popularity are currently receiving traffic from a large number of geographic locations.

Figure 1:
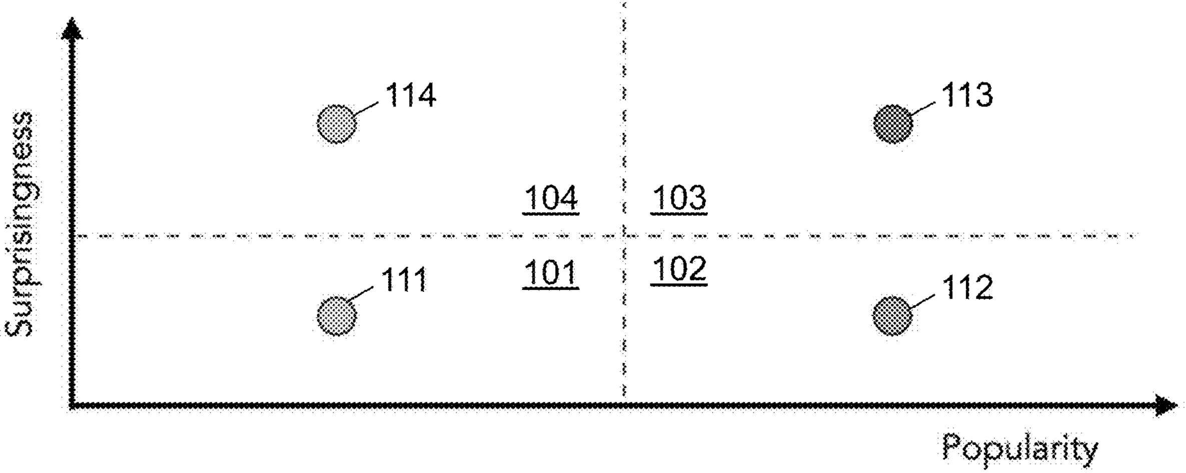
FIG. 1 schematically illustrates popularity and surprisingness for specific ports, in accordance with embodiments of the disclosure.

FIG. 1 is a schematic illustration 100 of popularity and surprisingness of scanning activity for specific ports 111-114, in accordance with embodiments of the disclosure. The behavior of a given port can vary with the time interval and protocol being studied.

Scanning activity for port 111 (quadrant 101) is neither popular nor surprising. Port 112, in quadrant 102, is popular, but the port behavior is not surprising. For example, port TCP 80 (http) experiences scanning traffic every day from users verifying that an http server is implemented.

Activity for port 113, in quadrant 103, is popular and surprising. This quadrant includes the set of ports for which a higher level of attention and further investigation are required. Activity for port 114, in quadrant 104, is not popular but surprising. This indicates that some unusual behaviors have been detected, but they are not widespread. This quadrant is interesting from the viewpoint of understanding trends: ports that will move to the third quadrant will likely come from the fourth quadrant.

3. Popularity and Geographical Pervasiveness

In various embodiments, different variables can be used as a proxy value for popularity of a specific destination port (number of requests received, number of distinct IP addresses, and so on). Popularity can be associated with the concept of geographical pervasiveness. Geographical pervasiveness has the intrinsic property of filtering out loud and localized scanning events (for example, a single research institution that tries to map open ports). The assumption behind this choice is that suspicious activities, such as botnets, present some spreading characteristics that tend to have global coverage.

In an embodiment, a processing system can determine a popularity score for a specific port. In this embodiment, the world map is divided into latitude and longitude geographic bins, a grid of small squares of 1 degree of length. Given that the world map has 180 possible values of longitude and 90 possible values of latitude with such quantization, there are we have 180×90, or approximately 16K geolocation bins. For each time interval T and (Port; Proto) tuple, a number of bins can be calculated that were observed to send at least one request towards that specific (Port; Proto) tuple. Note that, in this context, the number of requests coming from a specific location in the time interval does not matter; any number of requests count the same, as long as they come from the same geographic bin. If K=($Port_x$, $Proto_y$) on T=D has a popularity score Pscore=N, it means that during time interval D, N different geographical bins were observed to make at least one request on K towards a specified port, which may be a port on a darknet.

4. Surprisingness Index

Probability theory can be used to numerically quantify the likelihood of a scanning event. Probability theory can also be applied to the geographic bins. Recalling the example of a research institution that tries to map open ports, it is likely that, from the geographic bin of that institution's servers, scanning will be performed periodically on generally unpopular ports (which is not itself surprising). Conversely, it is surprising for usually silent areas to begin to massively scan certain ports.

In an embodiment, a processing system can calculate, for each geographic bin B=(long, lat) the observed scanning probability $P_{obs}$ of K=($port_x$, $proto_y$) during a certain period of time Δ. The probabilities are computed across an aggregation time T. The probabilities can then be thresholded, meaning that they cannot be either equal to 0.0 (scanning never occurs) or 1.0 (scanning always occurs). If, for example, across a period of time Z, K has been scanned at least once U times in $B_i$, then $P_{obs,\ K,\ Bi}=\max(P_{th\text{-}min}, \min(P_{th\text{-}max}, U/Z))$.

Given a specific time interval T=D and given that port K has been scanned by S={$B_1$, $B_2$, . . . , $B_N$} bins, the surprisingness index SI is defined as $$SI_{K,D}=(1/N)\Sigma^{N}_{i=1}\log_{10}(P_{obs,\ K,\ Bi})$$

This value quantifies the average order of magnitude of how unlikely a particular scanning event of tuple K=($port_x$, $proto_y$) is to happen. The greater the index SI, the more surprising the event.

Figure 2:
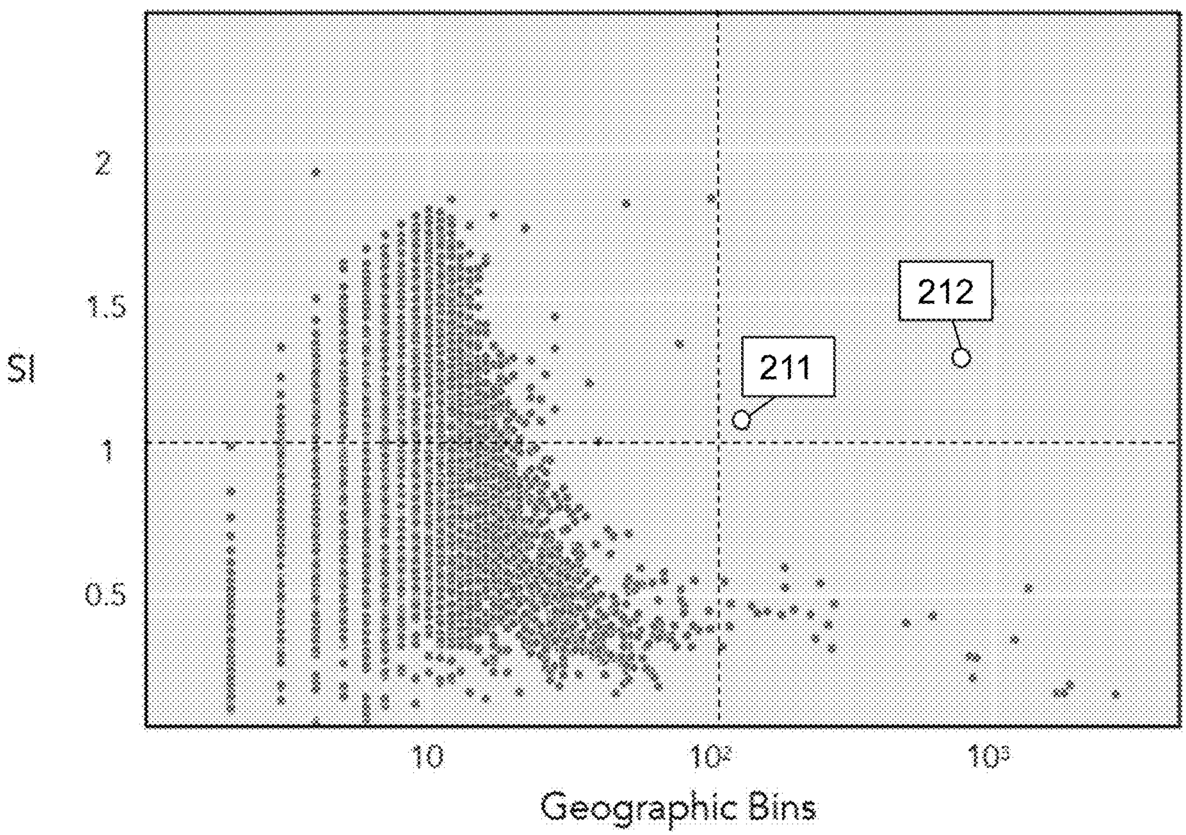
FIG. 2 is a plot depicting surprisingness index (SI) values for scanning activity at a set of geolocated ports, according to additional embodiments of the disclosure.

FIG. 2 is a plot 200 depicting surprisingness index (SI) values, calculated by a processing system, for scanning activity at a set of ports, according to an embodiment of the disclosure. Plot 200 shows the relationship between SI and geographic bins for the TCP protocol over a 1 day period. A relatively small number of ports received one or more requests from more than 100 geographic bins; of those, only ports 211, 212 had a surprisingness index greater than 1. In this embodiment, the processing system can proceed to highlight ports 211, 212 as requiring further investigation.

Figure 3:
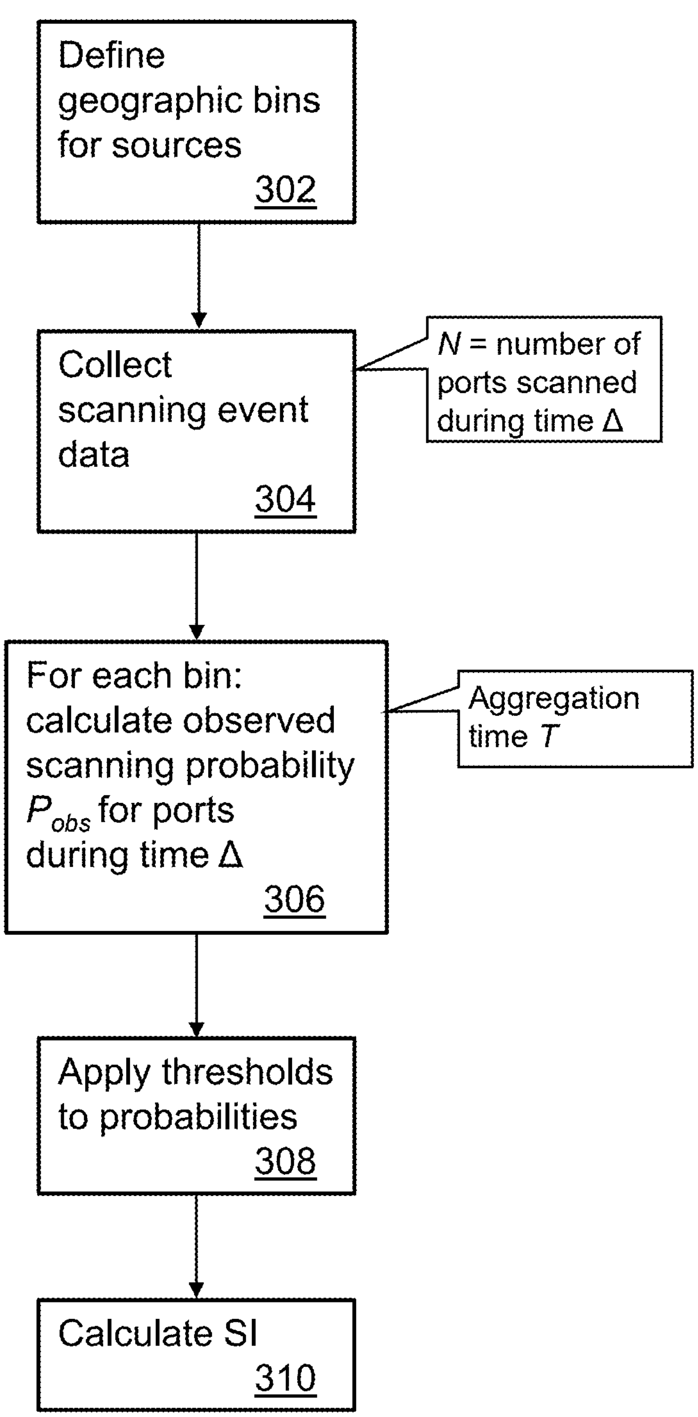
FIG. 3 is a flowchart depicting a procedure for determining the SI for a particular port, in accordance with further embodiments of the disclosure.

FIG. 3 is a flowchart depicting a procedure 300 for determining the SI for a particular port, in accordance with further embodiments of the disclosure. In step 302, a processing system defines geographic bins for locating scanning sources; in an embodiment, a world map is divided into a grid of squares having 1 degree of longitude/latitude on a side. The system collects scanning event data (step 304) for ports scanned in a given period of time. For each geographic bin, the system calculates an observed scanning probability for the respective ports (step 306); the probabilities are computed across an aggregation time. Thresholds are applied to the probabilities (step 308), so that the probabilities are greater than 0 but less than 1. The surprisingness index SI is then calculated (step 310) for a specific time interval and a specific port.

5. Detecting Suspicious Ping Scans

In additional embodiments, a processing system can perform a method to detect suspicious ICMP (Internet Control Message Protocol) ping scans. ICMP pings can be used to check whether a host at a particular IP address is "alive". A positive response (a "ping reply") indicates that the target host is in some sense working (or at least its network stack is working) and that there is network connectivity both ways. A failure to respond after a short timeout (generally a few seconds) is taken as evidence that the host is absent, or has failed, or there is some networking problem.

There are many legitimate uses of ICMP pings in computer networks. For example, a management system might ping each host in some distributed system every few seconds so that failures can be detected rapidly, independently of the signaling and data traffic between the components of the distributed system. If a network user suspects that contact with a distant system (e.g. a website) has been lost, the user can ping that system to determine whether it responds.

There are also several malicious uses of ICMP pings in network attacks, particularly for reconnaissance. For example, an attacker who has compromised one host in a network can use ICMP pings to find addresses of other live hosts on that network; the attacker er could scan many addresses randomly, and find a few hosts that respond.

6. Source Information and Entropy

A network defender can take advantage of a distinction between the experiences of a target address pinged by innocent scanners and malicious scanners: When a target address $x_i$ is pinged by an innocent scanner, it is usually pinged by many other innocent scanners, or it is pinged many times by the same innocent scanner. When a target address $x_i$ is pinged by a malicious scanner, it is usually not pinged many times, and often not pinged at all by other scanners. Stated another way: Frequently pinged targets indicate innocent scanning, while rarely pinged targets indicate malicious scanning.

In one or more embodiments, a processing system can construct a probability distribution for ping targets:

$$P(x_i)\text{=probability of seeing a ping to target address } x_i$$

If the set of target addresses X is viewed as an "alphabet" of symbols in an information theoretic sense, the information content of a particular symbol $x_i$ is:

$$I_{target}(x_i)=-\log_2 P(x_i)$$

The maximum information in the set of targets is:

$$\text{info}_{max}=\max(I_{target}(x_i)\text{ for } x_i \text{ in } X)$$

Over a given time period, the set of target addresses can be pinged by sources with a set of source addresses S. For each source address $s_j$ in S there is a set $T_j$ of its targets (where $T_j$ is a subset of X), such that during that time period, source $s_j$ sends at least one ping (and perhaps many pings) to every target in $T_j$.

The total information for each source $s_j$ is given by $$I_{source}(s_j)=\text{sum } I_{target}(t)\text{ for } t \text{ in } T_j$$

The total information for a particular source is thus defined to be the sum of the information associated with every distinct target that it pings over that time period.

In one or more embodiments, two additional measures are defined for each source: Targets and Entropy. Targets counts the number of distinct destinations pinged by a source during the time period:

$$\text{Targets}(s_j)\text{=number of elements in } T_j$$

Entropy is the average information per target (for a particular source). For each source duplicate pings to the same target are ignored (thus all targets are weighted equally), and the average is the total information divided by the number of targets: Entropy $(s_j)=I_{source}(s_j)/\text{Targets}(s_j)$

7. Probability Distribution of Targets

In various embodiments, ping-scan data can be obtained from NetFlow/IPFIX (IP Flow Information Export) statistics collected at routers and/or switches on a network. In particular embodiments, NetFlow/IPFIX statistics are processed in 10-minute batches, with the data collected in a table; each entry in the table includes a timestamp, a source address, and a destination address.

In an embodiment, the tables for the respective batches are combined into a single table by taking the union over all 4032 10-minute batches in a 28-day period. The total length of the combined table can be expressed as Total=length (UNION (all batches))

In this embodiment, a processing system can produce a per-destination probability table by counting the number of (Timestamp, Source) pairs for each destination and then dividing by Total. A procedure for this can be expressed in SQL (Structured Query Language) as

```
SELECT Destination AS Target,
    COUNT (*)/Total AS Probability
FROM UNION (all of those batches)
    GROUP BY Destination
```

The desired probability distribution $P(x_i)$ for each target IP address $x_i$ is in the form of a table with columns:

Target, Probability

8. Metrics for Suspicious Sources

Figure 4:
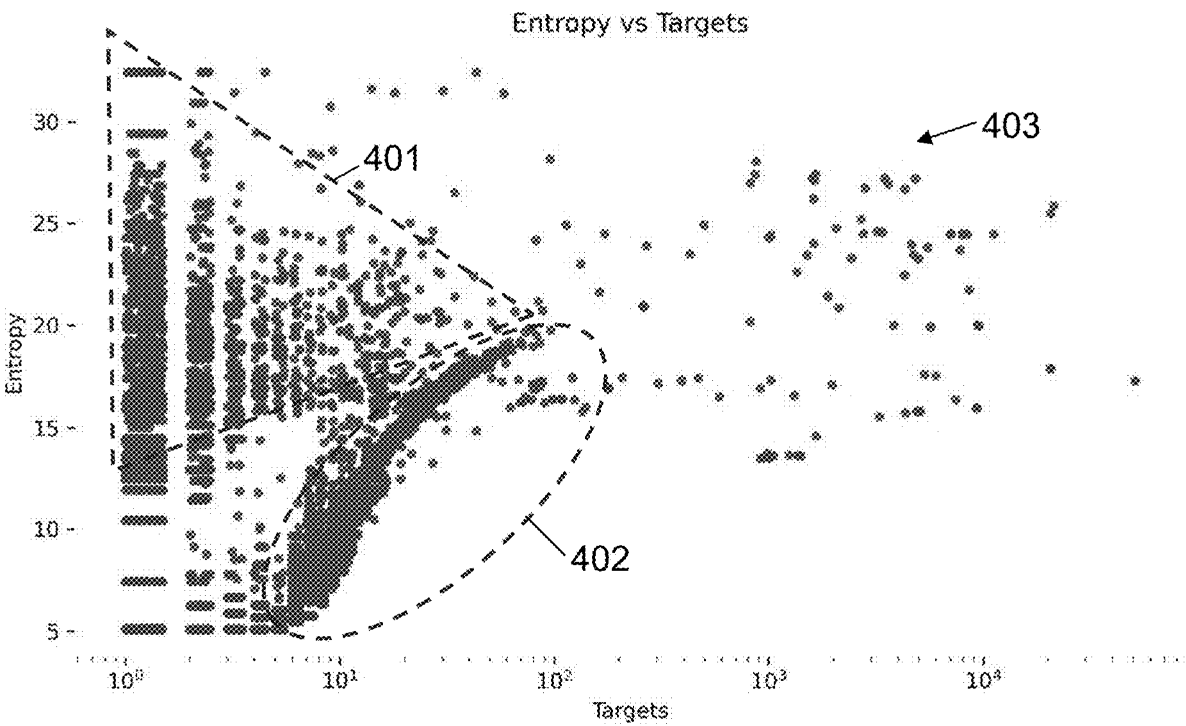
FIG. 4 is a plot depicting ping-scan sources and entropy associated with those sources, according to additional embodiments of the disclosure.

FIG. 4 is a plot 400 depicting ping-scan sources and entropy associated with those sources, according to an embodiment of the disclosure. Plot 400 is based on data collected over a 1-day period. The plotted point for each source shows the number of targets pinged by that source, and the entropy for that source.

In plot 400 there are three intermixed populations of sources:

(1) Up to 10 targets, medium entropy: region 401

(2) From 5 to about 100 targets, low entropy: region 402

(3) A much more dispersed population with medium-to-high entropy: region 403.

Sources in region 403 are of greatest interest as possible malicious sources.

Figure 5:
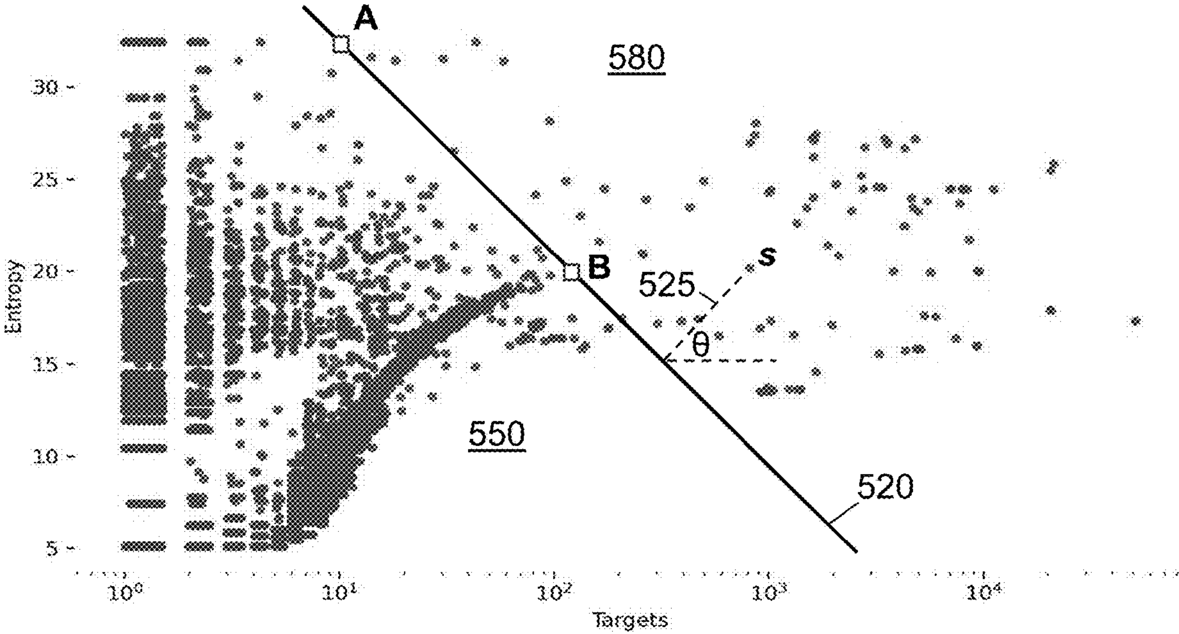
FIG. 5 is a plot illustrating a procedure for identifying suspicious ping-scan sources using the plot of FIG. 4, according to further embodiments of the disclosure.

FIG. 5 is a plot 500 illustrating a procedure for identifying suspicious ping-scan sources using plot 400 from FIG. 4. As shown in FIG. 5, a line 520 divides region 550 (likely to have innocent scanners) from region 580 (possibly having suspicious scanners). Line 520 is drawn through points A and B (control points), where A corresponds to 10 targets and entropy about 32, and B corresponds to 100 targets and entropy about 20.

In an embodiment, a metric Score ($s_{Targets}$, $s_{Entropy}$) is constructed to highlight suspicious sources. The Score is defined as follows:

Control point A: $A_{Targets}=10$ $A_{Entropy}=info_{max}$

Control point B: $B_{Targets}=120$ $B_{Entropy}=20$ $$m=(A_{Entropy}-B_{Entropy})/(\log_e A_{Targets}-\log_e B_{Targets})$$

$$\theta=\tan^{-1}(-1/m)$$

$\text{Score}(s_{Targets}, s_{Entropy})=\cos\theta\times(\log_e s_{Targets}-\log_e B_{Targets})+\sin\theta\,(s_{Entropy}-B_{Entropy})$ As shown in FIG. 5, the Score for source s in region 580 is represented by the distance 525 from s to line 520 (525 being perpendicular to 520). The angle θ is the angle between line 525 and a line parallel to the horizontal axis. The Score has a positive value for points in region 580 and a negative value for points in region 550.

Figure 6:
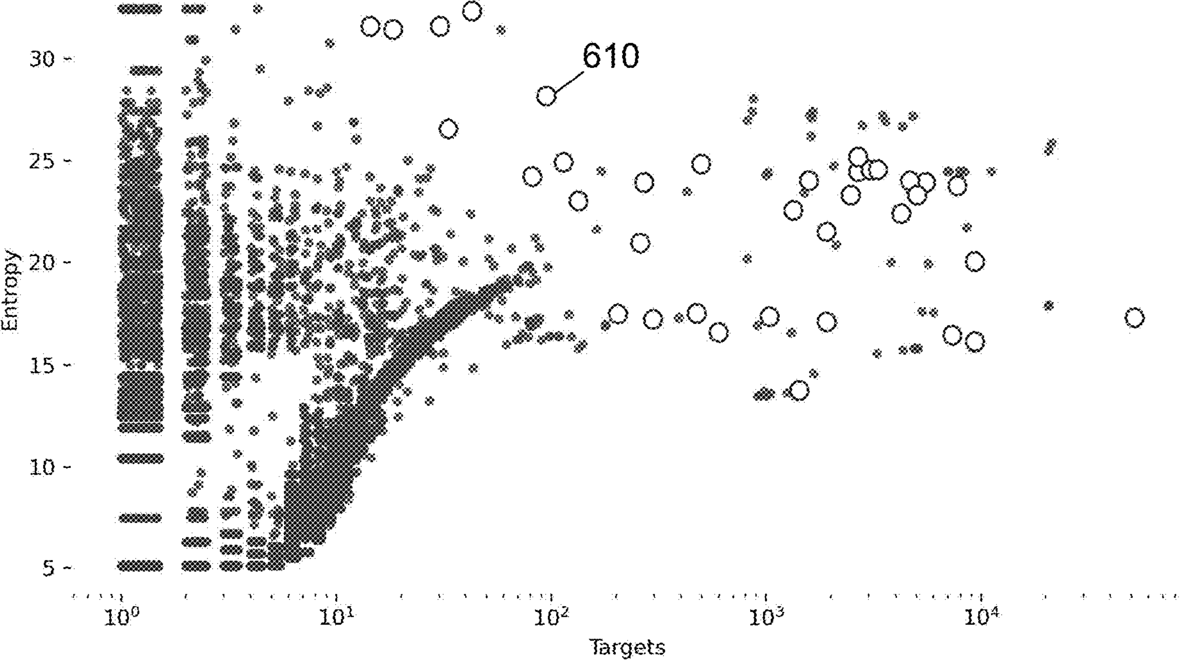
FIG. 6 is a plot illustrating a procedure for identifying suspicious ping-scan sources using the plot of FIG. 5 and a historical criterion, according to further embodiments of the disclosure.

Since scanners that appear frequently are more likely to be innocent scanners, while suspicious scanners appear less frequently, a historical criterion can be applied to highlight scanners in region 580 (scanners whose Score is >0) that appear relatively infrequently. FIG. 6 is a plot 600 illustrating highlighting sources (e.g. source 610) using a historical criterion; in the example of FIG. 6, scanners are highlighted that have appeared on fewer than half the previous days in a 1-year period.

It will be appreciated that by using these metrics, a large set of suspicious scanners (perhaps thousands) can be reduced to a few dozen for more thorough investigation.

Figure 7:
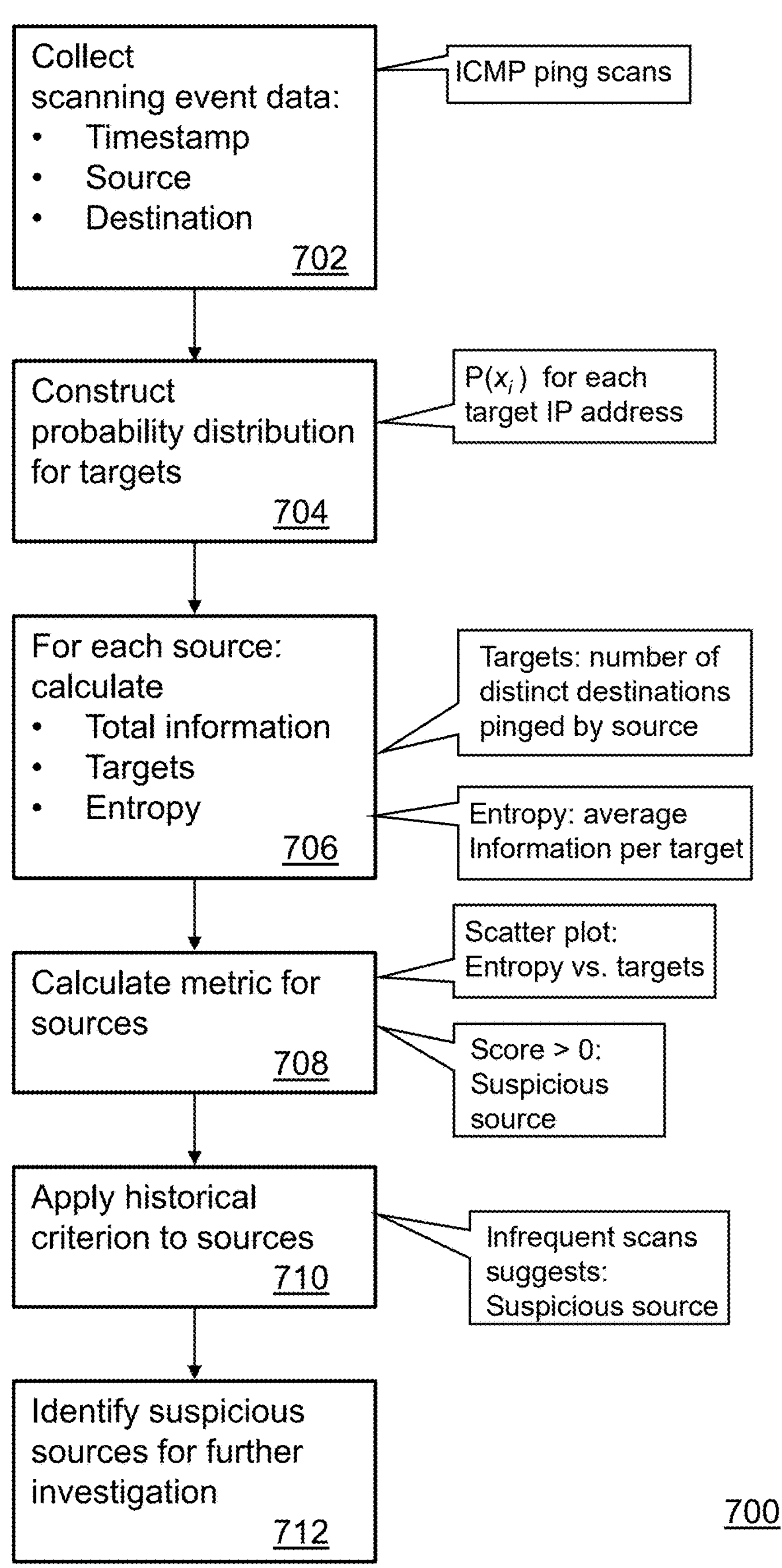
FIG. 7 is a flowchart depicting a procedure for detecting suspicious ping scans, in accordance with further embodiments of the disclosure.

FIG. 7 is a flowchart depicting a procedure 700 for detecting suspicious ping scans, in accordance with further embodiments of the disclosure. In step 702, a processing system collects data regarding scanning events; each event has a timestamp, a source and a destination. In an embodiment, the scanning events are ICMP ping scans. The system then constructs a probability distribution for targets (step 704), and calculates the total information, targets and entropy for each source (step 706).

A metric is calculated (step 708) for the sources to determine which sources are suspicious. In particular embodiments, this is done by plotting entropy vs. targets for the sources in a scatter plot. In additional embodiments, a score is calculated for each source, with the score value indicating whether the source should be considered suspicious. The system can then apply a historical criterion to the sources, based on historical observations that relatively infrequent scans indicate a suspicious source (step 710). A set of suspicious sources is then identified for further investigation (step 712).

The procedures described herein may be used with any type of data where signals are sent from a collection of sources to a collection of targets, with traffic between sources and targets occurring at known times. In further embodiments, the signals can be network traffic other than ping scans, between source and target IP addresses.

In additional embodiments, sources and targets can be of other types; furthermore, sources and targets need not be of the same type. For example, sources and/or targets can be ports, users, domain names, subnets, autonomous systems, etc. In one embodiment, the sources can be users and the targets can be domain names.

9. Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
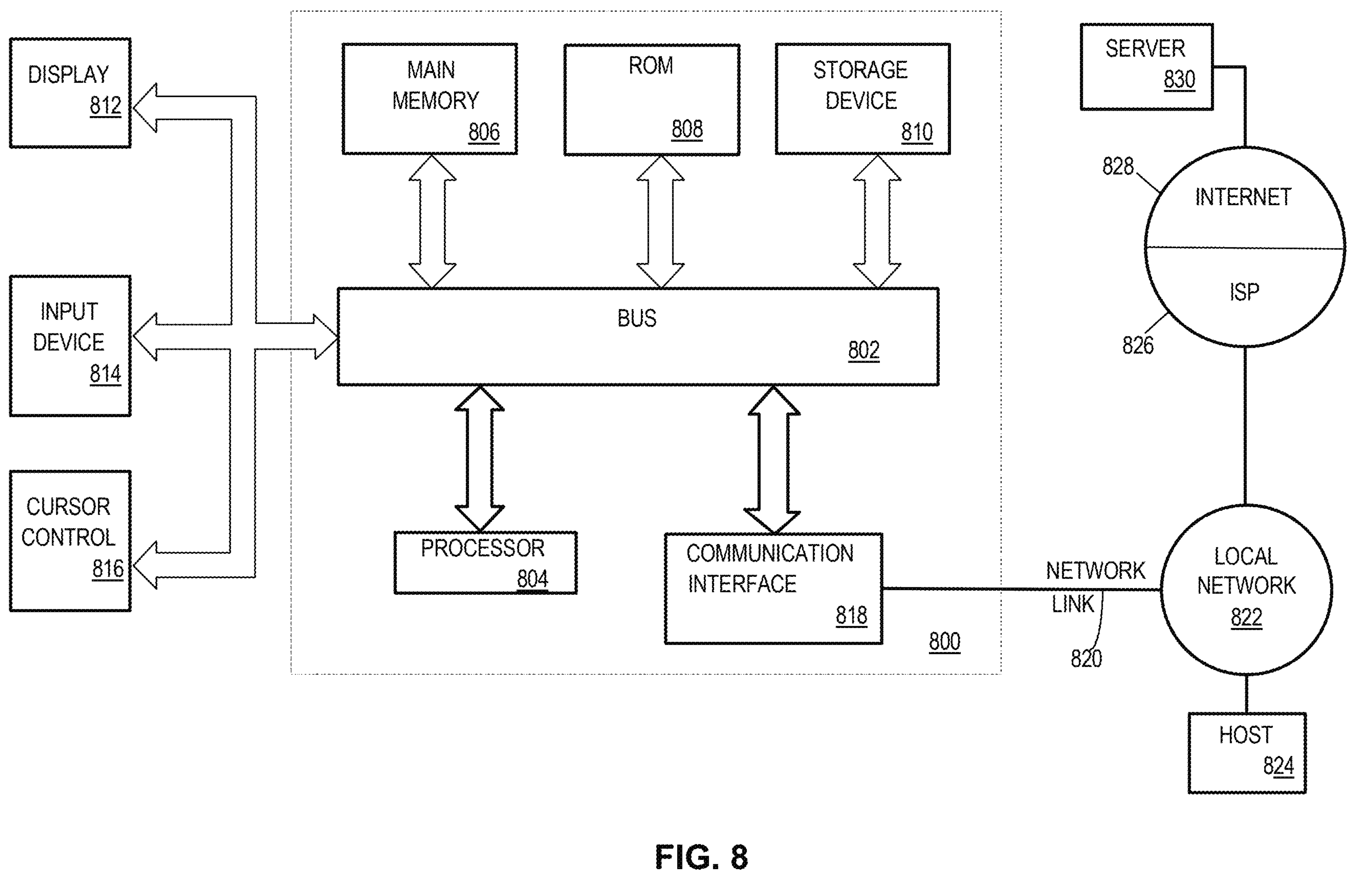
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world-wide packet data communication network now commonly referred to as the "Internet" 828. Local network 822 and Internet 828 both use electrical, electromagnetic, or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

10. Software Overview

Figure 9:
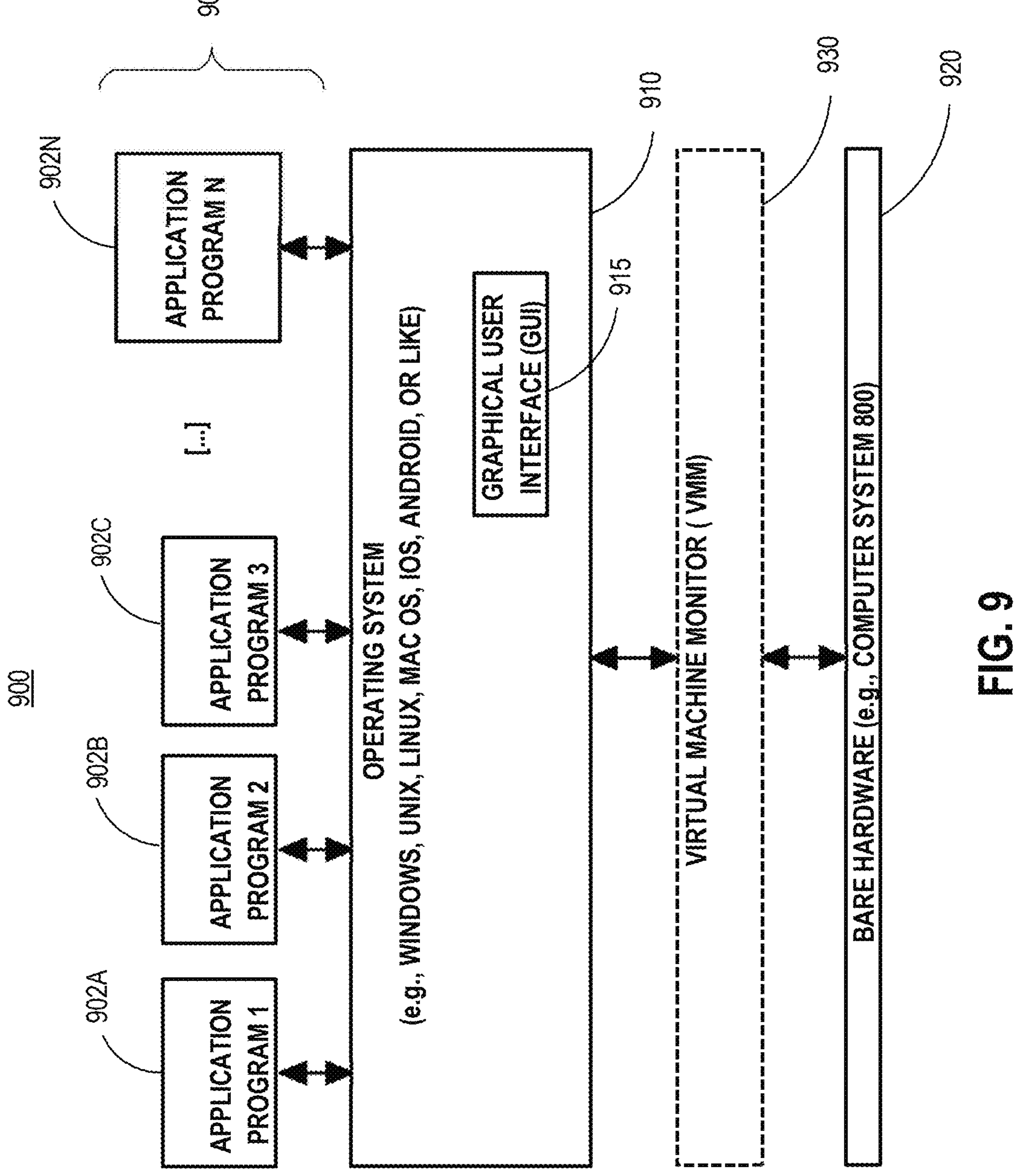
FIG. 9 is a block diagram of a basic software system that may be employed for controlling the operation of a computer system upon which an embodiment of the invention may be implemented.

FIG. 9 is a block diagram of a basic software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

11. Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:

receiving signals via a network at a plurality of ports on the network, wherein the signals correspond to scanning activity at the plurality of ports respectively by a plurality of sources on the network, wherein the plurality of sources are located at a plurality of geographical bins;

determining a popularity score for each of the plurality of ports, based on a number of geographical bins sending signals to the respective ports in a first time period;

calculating, for each of the geographical bins, a probability of scanning activity occurring in a second time period at a port of the plurality of ports, resulting in a plurality of probabilities for that port;

calculating, for each respective port of the plurality of ports, a surprisingness index based on the plurality of probabilities for the respective ports, wherein the surprisingness index quantifies an average order of magnitude of how unlikely a particular scanning event is to occur; and generating, in accordance with the popularity score and the surprisingness index for each of the plurality of ports, a representation of an estimated likelihood that the port is experiencing suspicious scanning activity, wherein the representation highlights one or more ports that have surprisingness indices indicating a relatively high likelihood that the one or more ports are experiencing suspicious scanning activity.

2. The computer-implemented method according to claim 1, wherein each port of the plurality of ports has a distinct Internet Protocol (IP) address.

3. The computer-implemented method according to claim 1, wherein the plurality of ports are a darknet, wherein the darknet is a set of assigned public Internet Protocol (IP) addresses that are assigned but unused.

4. The computer-implemented method according to claim 1, wherein each of the geographical bins corresponds to a distinct combination of a latitude and a longitude.

5. The computer-implemented method according to claim 1, wherein the plurality of probabilities is calculated across a predetermined aggregation time.

6. The computer-implemented method according to claim 1, wherein each of the plurality of probabilities is not equal to 0 and is not equal to 1.

7. The computer-implemented method according to claim 1, wherein the estimated likelihood is based on the popularity score of the port being above a predetermined popularity level and the surprisingness index of the port being above a predetermined surprisingness level.

8. A system comprising:

a processor; and a memory that stores executable instructions that, when executed by the processor, facilitate performance of operations, the operations comprising:

receiving signals via a network at a plurality of targets on the network, wherein the signals correspond to traffic at the plurality of targets respectively initiated by a plurality of sources on the network, wherein the plurality of sources are located at a plurality of geographical bins;

determining a popularity score for each of the plurality of targets, based on a number of geographical bins sending signals to the respective targets in a first time period;

calculating, for each of the geographical bins, a probability of traffic occurring in a second time period at a target of the plurality of targets, resulting in a plurality of probabilities for that target;

calculating, for each respective target of the plurality of targets, a surprisingness index based on the plurality of probabilities for the respective targets, wherein the surprisingness index quantifies an average order of magnitude of how unlikely a particular scanning event is to occur; and generating, in accordance with the popularity score and the surprisingness index for each of the plurality of targets, a representation of an estimated likelihood that the target is experiencing suspicious traffic, wherein the representation highlights one or more targets that have surprisingness indices indicating a relatively high likelihood that the one or more targets are experiencing suspicious scanning activity.

9. The system of claim 8, wherein the plurality of targets and the plurality of sources comprise one or more of ports, users, domain names, subnets, or autonomous systems.

10. The system of claim 9, wherein the plurality of targets are a darknet including a plurality of ports, and wherein the darknet is a set of assigned public Internet Protocol (IP) addresses that are assigned but unused.

11. The system of claim 8, wherein the plurality of targets are of a first type and the plurality of sources are of a second type different from the first type.

12. The system of claim 8, wherein each target of the plurality of targets has a distinct Internet Protocol (IP) address.

13. The system of claim 8, wherein each of the geographical bins corresponds to a distinct combination of a latitude and a longitude.

14. The system of claim 8, wherein the plurality of probabilities is calculated across a predetermined aggregation time.

* * * * *